(12) United States Patent
Peyravian et al.

(10) Patent No.: US 7,315,948 B1
(45) Date of Patent: Jan. 1, 2008

(54) TIME STAMPING METHOD EMPLOYING A SEPARATE TICKET AND STUB

(75) Inventors: Mohammad Peyravian, Cary, NC (US); Allen Roginsky, Durham, NC (US); Nevenko Zunic, Wappingers Falls, NY (US); Stephen M. Matyas, Jr., Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,921

(22) Filed: Dec. 10, 1999

(51) Int. Cl.
*H04L 9/00* (2006.01)
*G06F 7/04* (2006.01)
*H04K 1/00* (2006.01)

(52) U.S. Cl. ............ 713/178; 713/155; 713/168; 713/176; 713/185; 726/10; 380/255

(58) Field of Classification Search ............ 380/283; 713/178
See application file for complete search history.

(56) References Cited

U.S. PATENT DOCUMENTS

| | | | |
|---|---|---|---|
| 5,001,752 A | 3/1991 | Fischer | |
| 5,136,646 A | 8/1992 | Haber et al. | |
| 5,373,561 A | 12/1994 | Haber et al. | |
| RE34,954 E | 5/1995 | Haber et al. | |
| 5,606,617 A * | 2/1997 | Brands | 380/30 |
| 5,778,071 A * | 7/1998 | Caputo et al. | 713/159 |
| 5,781,629 A * | 7/1998 | Haber et al. | 713/177 |
| 6,393,566 B1 * | 5/2002 | Levine | 713/178 |
| 6,587,945 B1 * | 7/2003 | Pasieka | 713/176 |
| 6,643,774 B1 * | 11/2003 | McGarvey | 713/155 |
| 6,993,656 B1 * | 1/2006 | Peyravian et al. | 713/178 |
| 2001/0002485 A1 * | 5/2001 | Bisbee et al. | 713/167 |
| 2003/0190046 A1 * | 10/2003 | Kamerman et al. | 380/286 |
| 2006/0080536 A1 * | 4/2006 | Teppler | 713/176 |
| 2007/0179748 A1 * | 8/2007 | Kanai | 702/187 |

FOREIGN PATENT DOCUMENTS

| | | | |
|---|---|---|---|
| EP | 1022640 A2 * | 7/2000 | |
| GB | 2378865 A * | 2/2002 | |
| WO | WO 99/16209 | 4/1999 | |

OTHER PUBLICATIONS

Menezes, Alfred, et al, Handbook of Applied Cryptography, CRC Press, Wahington D.C., 1996.*
Schneier, Bruce, Applied Cryptography, 1996, John Wiley & Sons, Inc., Second Edition, p. 216.*

* cited by examiner

Primary Examiner—Christopher Revak
Assistant Examiner—Aravind K Moorthy
(74) Attorney, Agent, or Firm—Coats & Bennett, P.L.L.C.

(57) ABSTRACT

A time stamping protocol has two stages referred to as the ticketing stage and the certification stage. During the ticketing stage, the document or other identifying data is sent to the TSA. The TSA generates a "ticket" based on the document or other identifying data and a time indication derived from a trusted clock. The ticket, which serves as an unsigned time stamp receipt, is transmitted back to the document originator. During the certification stage, the holder of the ticket requests a certified time stamp receipt by presenting the ticket to the TSA. The TSA verifies the ticket and generates a signed time stamp receipt, called the ticket stub, which is then transmitted back to the document originator. The ticket stub serves as a "universal time-stamp" that the holder of the ticket stub can use to prove the date of the document.

32 Claims, 3 Drawing Sheets

| D or H | T | ID | SN |

FIG. 3

| MAC | R |

FIG. 4

| sig(MAC), SIG(MAC,K), or sig(R) |

FIG. 5

TIME STAMPING METHOD EMPLOYING A SEPARATE TICKET AND STUB

BACKGROUND OF THE INVENTION

The present invention relates generally to cryptographic protocols and, more particularly, to a time-stamping protocol for time-stamping digital documents.

There are times when it is desirable to prove the existence of a document as of a particular date. For example, patent disputes concerning the inventorship of an invention often turn on who is able to produce corroborating documentary evidence dating their conception of the invention. A common procedure for dating records is to keep the records in a daily journal or notebook with each page sequentially numbered and dated. Another procedure for dating a record is to have the record witnessed by an uninterested or trusted party that can attest to the existence of the document. The increasing use of computers, however, makes these time-stamping methods obsolete. It is relatively easy to change the date-stamp added to a document by the computer when the document was created. Further, while it is difficult to alter a paper document without leaving some signs of tampering, digital records can be easily altered or revised without leaving any evidence of tampering. Therefore, people are less likely to trust a digital document than a paper document that has been time-stamped using conventional time-stamping procedures.

To be trusted, a time-stamping procedure for digital documents should meet the following criteria:

1. The data itself must be time-stamped, without any regard to the physical medium on which it resides.
2. It must be impossible to change a single bit of the data without that change being apparent.
3. It must be impossible to timestamp a document with a date and time different than the current date and time.

One method for time-stamping a digital document would be to archive the document with a trusted escrow agent. In this case, the document originator sends a copy of the digital document to a trusted escrow agent. The escrow agent records the date and time that the document was received and retains a copy in his archives. Later, if a dispute arises over the date of the document, the document originator can contact the escrow agent who produces his copy of the document and verifies that it was received on a particular date. This time-stamping procedure has a number of drawbacks. First, the document originator must disclose the contents of the document to the escrow agent. Also, large documents take a relatively long period of time to transmit to the escrow agent and they require a large amount of data storage.

An improvement of the escrow procedure is to use a hash of the document. Instead of sending the document to the escrow agent, the document originator hashes the document using a one-way hash algorithm and sends the generated hash value to the escrow agent. The escrow agent stores the hash value along with the date and time that it was received in his archives. Later the document originator can use the services of the escrow agent to prove the existence of the document as of a particular date. The disputed document can be hashed and the resulting hash value can be compared to the hash value stored by the escrow agent in his archives for equality. If the hash values are equal, the document is presumed to be in existence as of the date associated with the stored hash value. One advantage of this method is that the document originator does not need to disclose the contents of the document to the escrow agent.

The need to escrow the document or hash value can be eliminated by having a time stamping authority generate a certified time stamp receipt using a cryptographic signature scheme as taught in U.S. Pat. No. Re. 34,954 to Haber et al. and Fischer, U.S. Pat. No. 5,001,752. In this case, the document originator hashes the document and transmits the hash value to the time stamping authority. The time stamping authority appends the current date and time to the hash value to create a time stamp receipt and digitally signs the time stamp receipt with a private signature key. The time stamping authority's public verification key is distributed and available to anyone interested in validating a time stamp receipt created by time stamping authority. The public verification key is typically stored in a public key certificate signed by a Certification Authority so that anyone desiring to validate the time stamp receipt with the public key can have confidence in the authenticity of the key.

SUMMARY OF THE INVENTION

The present invention is a time-stamping protocol for time-stamping digital documents so that the date of the document can be verified. The method presumes the existence of a trusted agent referred to herein as the time-stamping authority (TSA). Generation of a signed time stamp receipt according to the present invention is divided into two stages referred to as the ticketing stage and the certification stage. During the ticketing stage, a digital representation of the document or other identifying data is sent to the TSA by a requester, typically by the document originator. The TSA generates a "ticket" based on the document or other identifying data and a time indication derived from a trusted clock. The ticket includes a time stamp receipt establishing the priority date and time of the document, and a message authentication code used by the TSA at a later date to authenticate the ticket. The ticket, which serves as an authenticated time stamp receipt, is transmitted back to the ticket requestor. During the certification stage, the holder of the ticket requests a certified time stamp receipt by presenting the ticket to the same TSA that generated the ticket. The TSA verifies the ticket by first authenticating the message authentication code in the ticket and then generating a certified time stamp receipt, called the ticket stub, provided that the message authentication code in the ticket is valid. The ticket stub is then transmitted back to the document requestor. The ticket stub may be generated by the TSA by signing the MAC, or by signing the time stamp receipt. The ticket stub serves as a "universal time-stamp" that the holder of the ticket stub can use to prove the date and time the document was originally received by the TSA.

BRIEF DESCRIPTION OF THE DRAWINGS

FIG. 3 is a schematic illustration of ticket request used by the time stamping protocol.

FIG. 4 is a schematic illustration of ticket used by the time stamping protocol.

FIG. 5 is a schematic illustration of a ticket stub used by the time stamping protocol.

DETAILED DESCRIPTION OF THE INVENTION

Figure 1:
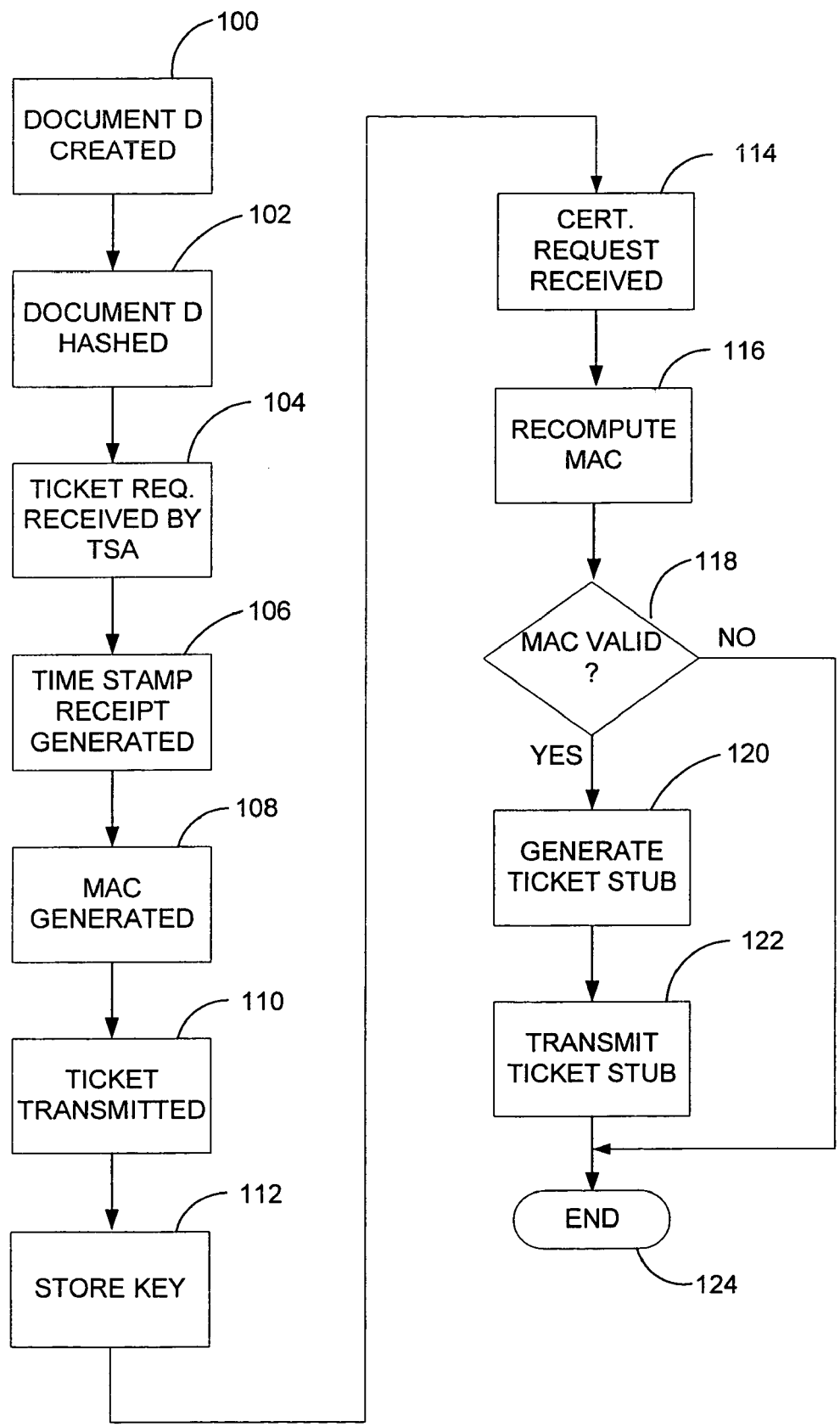
FIG. 1 is a flow diagram illustrating a first embodiment of the time stamping protocol of the present invention.

FIG. 1 is a flow diagram illustrating the general process of time-stamping a document according to the present invention. A document D is created at step 100. The document D is presumed to be in digital form and may comprise any alphanumeric, audio, or graphic presentation of any length. The document D may optionally be hashed at step 102 using a one-way hashing function to generate a digital sequence that identifies the document. A hash function is a function that takes a variable length input string, called a pre-image, and converts it to a fixed-length string, called a hash value, denoted H. The pre-image in this case is the document D or selected portions thereof. A one-way hash function operates in only one direction. While, it is easy to compute a hash value from the pre-image, it is computationally impractical to find a pre-image that hashes to a given hash value. Thus, it is practically impossible to recover the pre-image given the hash value and knowledge of the hash algorithm. Another feature of a hashing function is that it is difficult to find any two pre-images that hash to the same value.

There are several advantages to sending a hash value H produced on document D instead of the document D itself. First, the hash value H improves security by functioning as a fingerprint of the document D. Changing a single bit in the document D will result in an entirely different hash value making it easy to detect efforts to modify a document D or hash value H. Second, the hash value H greatly reduces the amount of data that must be transmitted to the TSA. This factor can be important where the available bandwidth is limited. Third, by sendin*g a hash value H in place of the document D, the content of the document D does not need to be disclosed to the TSA.

Any known hashing function, such as the SHA-1, MD5, and RIPEMD-160, can be used in the present invention. For the remaining description of the time stamping protocol, it will be assumed that the document D has been hashed and that the hash value H has been sent to the TSA in lieu of the document D. It is understood, however, that one can practice the invention by substituting the document D, selected portions of the document D, or some other function of D in place of the hash value H in the protocol.

The hash value H generated on document D or a selected portion thereof is transmitted to the TSA as part of a ticket request. After receiving the ticket request at step 104, the TSA generates a time stamp receipt R at step 106 using the hash value H contained in the ticket request and the current time T. Other optional data such as an identification number ID of the document originator, or a sequential record number SN, could also be used to generate the time stamp receipt. The optional data can be provided by the document originator or generated by the TSA. The current time T is generated by a trusted clock controlled by the TSA, or alternatively, obtained by the TSA from a trusted source. The time stamp receipt R is generated by concatenating the hash value H with the current time T and optionally other data, such as the identification number ID of the requester and a sequential record number SN. The time indication may include a standard 32 bit representation of computer clock time plus a literal string to make the time stamp receipt more legible. Requiring an identification number ID and sequential record number SN may improve security by making it more difficult to create counterfeit time stamp receipts. The time stamp receipt R, shown in FIG. 3, would then comprise the string (H, T, ID, SN).

Referring back to FIG. 1, the time stamp receipt R and a secret key K are used by the TSA to generate a message authentication code MAC at step 108. The key K is a secret, symmetric key that is securely generated, stored and protected by the TSA until such time as the ticket is used to request a ticket stub, after which the key K is disclosed (i.e., it becomes a public value), as hereinafter described. A relatively simple method to generate a MAC is to append the secret key K to the time stamp receipt R and then hash the resulting string using any suitable hashing function, such as SHA-1, MD5, or RIPEMD-160. The MAC would then comprise the string H(R,K).

A message authentication code can also be generated using the HMAC authentication method as described in H. Krawczyk, M. Bellare, R. Canetti, "HMAC: Keyed-Hashing for Message Authentication," Network Working Group, RFC 2104, February 1997. The HMAC authentication method is applied to an input data string by using the secret key K and any suitable hashing function H (e.g. MD5, SHA-1, or RIPEMD-160). The input data is broken into a series of blocks of predetermined length depending on the hash algorithm being used. For SHA-1, the block length is 64 bytes. The method defines two strings called the inner pad (ipad) and outer pad (opad) as follows:

ipad=byte 0x36 repeated 36 times
opad=byte 0x5c repeated 36 times

The HMAC authentication method can be implemented using the following steps:
1. Append zeros to the end of K to create a string the size of the hash input block.
2. XOR the padded key K with ipad.
3. Append the data to the result of step 2.
4. Apply the hashing function to the result of step 3.
5. XOR the padded key from step 1 with the output of the hashing function from step 4.
6. Append the output of step 4 to the result of step 5.
7. Apply the hashing function to the result of step 6.

Using the HMAC authentication method, the MAC is represented by the string H(K xor opad, H(K xor ipad, R)).

The examples given are meant to illustrate some of the techniques that can be used to generate a MAC. However, the invention is not limited to the methods described above and can, in fact, be implemented using any MAC generation method that employs a secret key K.

The MAC and time stamp receipt R form a ticket that is transmitted to the ticket requestor at step 110. The ticket, shown in FIG. 4, is thus represented by the string (MAC, R). When the ticket is transmitted to the ticket requester, the TSA stores the secret key K in a database at step 112 to use at a later date to verify a time stamp receipt received during the certification stage of the protocol as hereinafter described. The ticket does not need to be stored in the database.

The ticket is an unsigned time stamp receipt that can be later presented to the TSA for certification. Thus, the ticket can be viewed as a TSA-specific time stamp receipt.

The certification stage begins when the ticket holder wants to have a certified time stamp receipt created by the TSA. This, in turn, will enable the ticket holder or any third party to prove the date of the document. At step 114, the holder of the ticket presents it to the TSA to request a certified time stamp receipt, referred to herein as the ticket stub. The ticket received by the TSA at step 114 contains the time stamp receipt R and MAC transmitted by the TSA to the ticket requester at step 110. Based on the time stamp receipt R, the TSA locates the matching key K stored in its archive. For example, a sequential record number SN included in the time stamp receipt could be used to index a database containing all the secret keys K used by the TSA to generate MACs. In this case, the sequential record number and secret key K are stored in the database when the ticket is transmitted. The secret key K corresponding to a particular time stamp receipt is, in this example, located by extracting the sequential record number SN from the time stamp receipt R received as part of the certification request and using the sequential record number SN to find the matching secret key K in the database. The index for the secret key K could also be a function of the MAC, timestamp record R, or both. For example, selected bits taken from the MAC or time stamp receipt R could be used to "look up' the secret key K. The particular method used to "look up" the secret key K is not a material aspect of the invention.

The TSA uses the retrieved secret key K to validate the time stamp receipt R and MAC received as part of the certification request. Validation is accomplished by recomputing the MAC using the received time stamp receipt R and the retrieved key K at step 116 and comparing the resulting MAC with the one received by the TSA as part of the certification request at step 118. If the MACs are equal, the time stamp receipt R and MAC are accepted as valid. Otherwise, the time stamp receipt R is rejected as invalid.

The TSA may establish a policy for retaining keys to limit the time keys must be stored. For example, the TSA may have a policy that it will retain the key values for 1 year unless instructed otherwise, and if no ticket stub has been requested in that period the key will be deleted. Alternatively, the TSA may generate the keys (K) from a single generation key using a fixed algorithm. This generation key could be changed periodically (e.g. every week or month). This would reduce the number of keys that need to be saved by the TSA.

If the received time stamp receipt R and MAC are valid, the TSA generates a certified time stamp receipt, or ticket stub S, at step 120 and transmits the ticket stub S to the ticket holder at step 122. The ticket stub S, illustrated in FIG. 5, may be generated by signing (1) the time stamp receipt R, or (2) the MAC, or (3) the MAC and key K, with its private signature generation key $K_{PR}$. In the first instance, the TSA generates a digital signature on R, denoted sig(R), using $K_{PR}$. In the second instance, the TSA generates a digital signature on MAC, denoted sig(MAC), using $K_{PR}$. In the third instance, the TSA generates a digital signature on MAC and K (e.g., on the concatenation of MAC and K), denoted sig(MAC, K), using $K_{PR}$. Although the third variation is not discussed further herein, the reader will appreciate that only a slight modification to the second method would be needed to perform the third method.

The signature generation key $K_{PR}$ is part of a public and private key pair ($K_P$, $K_{PR}$) used by the TSA to certify time stamp receipts. The private signature key $K_{PR}$ is known only to the TSA. The public verification key $K_P$, is made available to the public so that anyone can verify or authenticate the TSA's signature. The public key $K_P$ can be stored in a certificate signed by a Certification Authority CA so that the TSA's public key can be validated and, hence, trusted by those using the public verification key $K_P$. The time stamp receipt R or MAC can be signed using any known cryptographic signature scheme, such as a digital cryptographic signature scheme based on the RSA algorithm.

As mentioned previously, the ticket stub S is transmitted by the TSA to the ticket holder at step 122. In one variation, where the certified time stamp receipt is generated by signing R with the TSA's private signature generation key $K_{PR}$, the ticket stub is comprised of the value sig(R). In another variation, where the certified time stamp receipt is generated by signing MAC with the TSA's private signature generation key $K_{PR}$, the ticket stub is comprised of the values sig(MAC) and K. In the second variation, the key K is included in the ticket stub in order that it may be used to validate the time stamp receipt. Once the TSA has performed the certification step (i.e., signed R or MAC), it is no longer necessary to keep K secret. In that case, K can be disclosed, thus enabling it to be used by the ticket holder, or any third party, to validate the certified time stamp receipt. In a possible alternative embodiment of the invention, the ticket stub could contain the time stamp receipt R and possibly other protocol-dependent information, as well as the signature generated on R or the signature generated on MAC.

In the case where the ticket stub includes a signed MAC, i.e., sig(MAC), the ticket holder can validate sig(MAC) as follows: A MAC is computed on the time stamp receipt R received in step 110 using the key K transmitted at step 122. Then, the TSA's public verification key $K_P$ can be used to validate that sig(MAC) is indeed a valid signature for the computed value of MAC.

The ticket stub is a universal time stamp receipt that can be used to verify and date a disputed document. In the case where the ticket stub S includes s TSA signature generated on the time stamp receipt R, the document is validated using the following steps. First, the document D is validated against the time stamp receipt R. If the time stamp receipt R includes a hash value generated on the document D, the disputing party can hash the disputed document D and compare the resulting hash value to the hash value H contained in the time stamp receipt R. Second, the signature generated on the time stamp receipt is validated using the TSA's public verification key $K_P$.

In the case where the ticket stub includes a TSA signature generated on the MAC, the verification of a disputed document D involves the following steps. First, the document D is validated against the time stamp receipt R. If the time stamp receipt R includes a hash value generated on the document D, the disputing party can hash the disputed document D and compare the resulting hash value to the hash value H contained in the time stamp receipt R. Second, the MAC is validated by re-computing the MAC using the time stamp receipt R and the key K and comparing the computed MAC to the received MAC for equality. Third, the signature generated on the received MAC is validated using the TSA's public verification key $K_P$.

Figure 2:
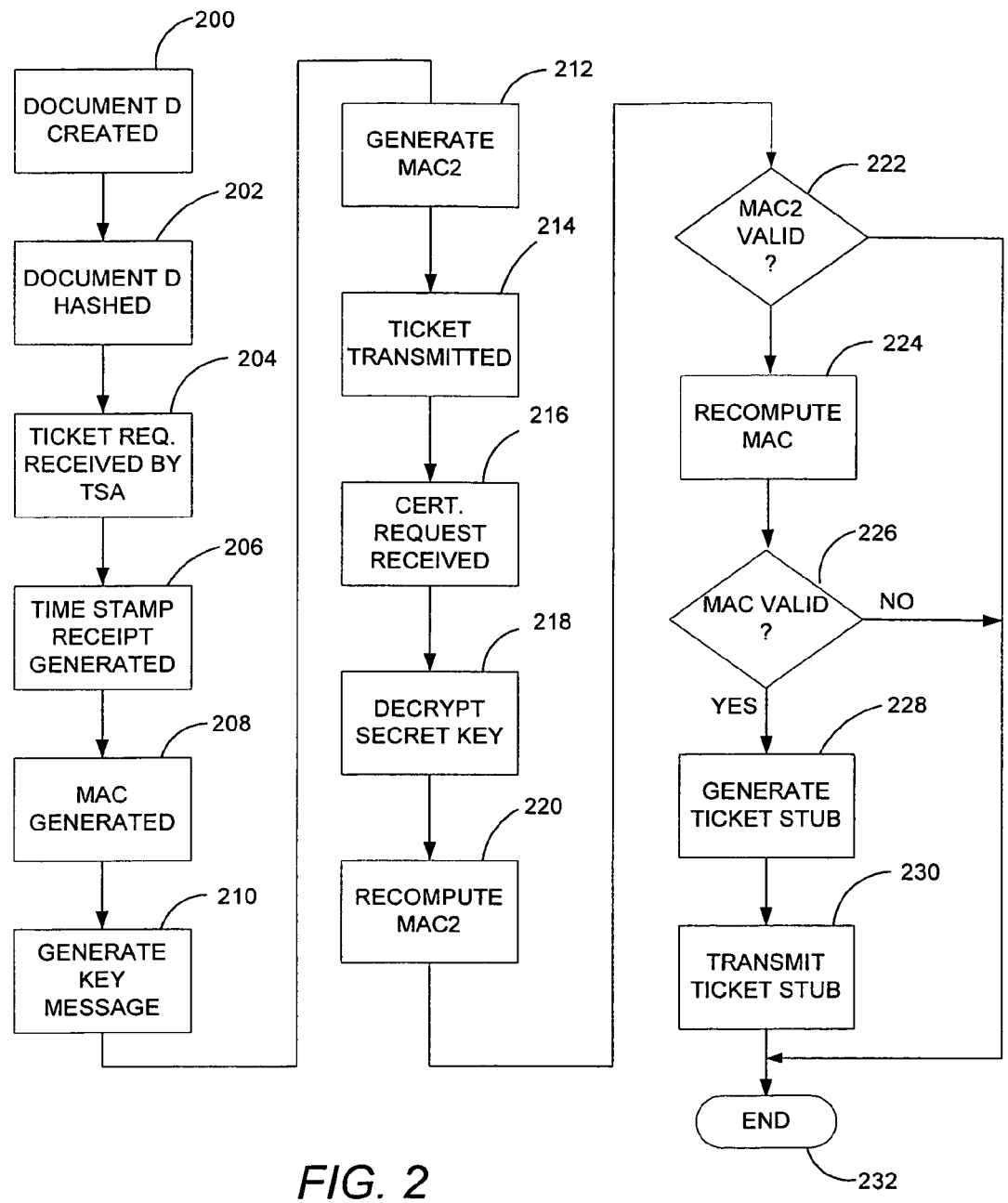
FIG. 2 is a flow diagram illustrating a second embodiment of the time stamping protocol.

FIG. 2 shows an alternate embodiment of the time-stamping protocol of the present invention. In this embodiment, the TSA does not store the random secret key K. Instead, the TSA has a secret master key $K_M$ that it uses to encrypt each secret key K. In this case, the secret K values can be given to the respective ticket holders, thus eliminating the need for the TSA to manage these keys, including the problem of purging keys. A ticket holder can discard a ticket if there is no anticipated need to obtain a ticket stub. However, if the TSA stores the K values, then the TSA may need to retain the key values for a long time, since the TSA has no way to know whether a ticket holder will or will not request a ticket stub at some future time. The TSA also has a MAC generation key $K_{MAC}$ that it uses to generate an additional message authentication code, denoted $MAC_2$, on MAC and K (e.g., on the concatenation of MAC and K).

Referring to FIG. 2, a document is created at step 200, optionally hashed at step 202, and transmitted to the time-stamping authority at step 204 as part of a ticket request. The TSA generates a time stamp receipt R at step 206 and message authentication code MAC at step 208 as described in the first embodiment. Additionally, the TSA encrypts the random secret key K using its secret master key $K_M$ at step 210. The encrypted key is denoted e(K). A second message authentication code $MAC_2$ is generated at step 212 on the first message authentication code MAC and key K using the secret MAC generation key, $K_{MAC}$. $K_{MAC}$ is a secret symmetric key used by the TSA for generating the second message authentication code. The second MAC is represented by the string H((MAC, K), $K_{MAC}$), where (MAC, K) denotes the concatenation of MAC and K.

The TSA transmits the time stamp receipt R, MAC, the encrypted key e(K), and $MAC_2$ to a designated party at step 214. The time stamp receipt R, MAC, encrypted key e(K), and $MAC_2$ comprise the ticket in this embodiment, which the ticket holder can later use to request a certified time stamp receipt. The ticket is represented by the string (R, MAC, e(K), $MAC_2$). Transmission of the ticket to the designated party completes the ticketing stage of the time-stamping protocol.

When the ticket holder desires a certified time stamp receipt, the ticket holder transmits a request to the TSA to initiate the certification phase of the time stamping protocol at step 216. The request includes a ticket comprising the time stamp receipt R, MAC, encrypted key e(K), and $MAC_2$, which were transmitted in step 214. The TSA retrieves the random secret key K by decrypting the encrypted key e(K) using its secret master key at step 218. Next, the TSA validates the second $MAC_2$ at steps 220, 222 by recomputing the second message authentication code on the first MAC, in the received ticket, and the decrypted value of K, using the MAC generation key $K_{MAC}$. The computed message authentication code is compared for equality with the second message authentication code $MAC_2$, in the received ticket. The TSA then verifies that the combination of K and MAC are valid at steps 224, 226. This is accomplished by computing a message authentication code on the received time stamp receipt R using the decrypted and authenticated value of K and then comparing the computed message authentication code with the received MAC for equality. If the above validation operations are successful, then the received ticket is accepted as valid. Otherwise, the ticket is rejected.

If the received ticket is valid, the TSA creates a ticket stub by signing either the time stamp receipt R, or alternatively by signing the MAC and additionally providing the ticket holder with the key K. The TSA signs the time stamp receipt R or MAC at step 228 with a private signature key $K_{PR}$ to generate the ticket stub which is then transmitted to the ticket holder at step 230. In the case where R is signed, the ticket stub contains only the digital signature generated on R, denoted sig(R). In the case where MAC is signed, the ticket stub contains the digital signature generated on MAC, denoted sig(MAC), and the key K. In the latter case, once the TSA has signed the MAC, it is no longer necessary to keep K secret. In that case, K can be disclosed without penalty, thus enabling it to be used by the ticket holder, or any third party, to validate the certified time stamp receipt. In a possible alternative embodiment of the invention, the ticket stub S could additionally contain the time stamp receipt R and possibly other protocol-dependent information.

In the case where the ticket stub includes a signed MAC, the originator verifies the signed MAC by generating a message authentication code on the time stamp receipt R using the received, disclosed key K and then comparing the computed MAC with the received signed MAC for equality. If the MAC is valid, the originator can additionally validate the signed MAC using the public key of the TSA. When a dispute arises concerning the document, the ticket stub can be used by any party to verify the date of the document as described above.

The time-stamping protocol of the present invention divides the certification process into two stages that have been referred to as the ticketing stage and the certification stage. One advantage of this time-stamping protocol is that tickets can be computed rapidly, since they do not involve costly public key operations. The computation of certified time stamp receipts or ticket stubs takes longer, since they require public key operations. At the TSA, priority can be given to the computation of tickets, since generation of the ticket establishes the priority date for the document. The ticket and stub approach also allows the TSA to defer the generation of certified time stamp receipts involving costly public key operations.

The ticket can be viewed as a TSA-specific time-stamp, whereas the ticket stub is a universal time stamp receipt. A ticket produced in accordance with the present invention represents the right to have a ticket stub or universal time stamp receipt generated at some future time. The document originator may not know what particular time-stamping services it will ultimately want. However, once a document is created, a ticket can be obtained immediately. When it is decided what additional time-stamping services are desired, a certification request can be made to receive a certified time stamp receipt or ticket stub.

The ticket and stub approach of the present invention also provides an attractive billing option for the TSA. For example, the TSA could offer a ticket service for free or at a substantially reduced price. Free or inexpensive tickets could be seen as an attractive inducement for users to make use of a time-stamping service. A user could obtain tickets on every draft of a document without waiting until a final draft is prepared. Later, the user can decide which documents it wants certified and what time-stamping services it wants.

Variations of the ticket and stub time-stamping protocol described herein will be apparent to those skilled in the art. For example, a ticket could be generated on two or more documents. Similarly, a single ticket stub could be generated on several tickets belonging to the same user. The invention could also make use of a binary tree of tickets where the TSA signs only the root of the tree.

The time-stamping procedures described herein may be implemented using general purpose programmable computers. A client program running on a user's computer could perform the steps of hashing documents and transmitting documents or hash values to the TSA. A server application running on a general purpose programmable computer controlled by the TSA could perform the steps of generating time stamp receipts, generating message authentication codes, signing time stamp receipts, and transmitting signed time stamp receipts to users. It would also be possible to implement some or all of the steps in firmware, or in hard-wired logic.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method for time stamping a document comprising:
    receiving a time stamp request at an outside agency at a first time, said time stamp request comprising identifying data associated with said document;
    creating at said outside agency a time stamp receipt based on said identifying data and a time indication; and
    generating at said outside agency a message authentication code based on said time stamp receipt and a secret key;
    transmitting said time stamp receipt and said message authentication code to a designated party;

receiving a certification request at said outside agency at a second time, said certification request comprising said time stamp receipt and said message authentication code;

validating said message authentication code at said outside agency using said secret key; and certifying said time stamp receipt at said outside agency using a cryptographic signature scheme if said message authentication code is valid.

2. The time stamping method of claim 1 wherein said identifying data comprises a digital representation of at least a portion of said document.

3. The time stamping method of claim 2 wherein said identifying data comprises a digital sequence derived by application of a deterministic function to at least a portion of said document.

4. The time stamping method of claim 3 wherein said digital sequence is a hash value derived by application of a one-way hashing function to at least a portion of said document.

5. The time stamping method of claim 1 wherein said time stamp receipt comprises a copy of at least a portion of said identifying data concatenated with said time indication.

6. The time stamping method of claim 5 wherein said time stamp receipt comprises a digital sequence derived from said identifying data concatenated with said time indication.

7. The time stamping method of claim 6 wherein the step of validating said message authentication code comprises recomputing said message authentication code at said outside agency using said received time stamp receipt and said secret key and comparing the recomputed message authentication code to said received message authentication code.

8. The time stamping method of claim 1 wherein said time stamp request further comprises an identification number associated with the requestor.

9. The time stamping method of claim 1 wherein said message authentication code comprises a digital sequence generated by application of a deterministic function to said time stamp receipt and said secret key concatenated together.

10. The time stamping method of claim 1 wherein the certifying step comprises signing said message authentication code using a private signature key controlled by said outside agency.

11. The time stamping method of claim 1 wherein the certifying step comprises signing said time stamp receipt using a private signature key controlled by said outside agency.

12. The time stamping method of claim 1 further comprising the step of storing said secret key in a database at said outside agency.

13. The time stamping method of claim 1 wherein each time stamp receipt comprises a sequential record number that is used at said outside agency to look up said secret key in said database.

14. The time stamping method of claim 1 further comprising the step of transmitting said certified time stamp receipt to said requester.

15. The time stamping method of claim 1 wherein certifying said time stamp receipt at said outside agency comprises signing said time stamp receipt with a private signature key.

16. The time stamping method of claim 1 wherein certifying said time stamp receipt at said outside agency comprises signing said message authentication code with a private signature key.

17. A method for time stamping a document comprising:

receiving a time stamp request at an outside agency at a first time, said time stamp request comprising identifying data associated with said document;

creating at said outside agency a time stamp receipt based on said identifying data and a time indication;

generating at said outside agency a message authentication code based on said time stamp receipt and a first secret key;

encrypting the first secret key with a second secret key to generate an encrypted key message;

generating a second message authentication code based on said first message authentication code and said first secret key using a third secret key;

transmitting said time stamp receipt, said first message authentication code, said second message authentication code, and said key message to said requestor;

receiving at said outside agency at a second time a certification request, said certification request comprising said time stamp receipt, said first message authentication code, said second message authentication code, and said encrypted key message;

decrypting at said outside agency said encrypted key message to recover said first secret key;

validating said second message authentication code at said outside agency using said third secret key;

validating said first message authentication code at said outside agency using said first secret key if said second message authentication code is valid; and certifying said time stamp receipt at said outside agency using a cryptographic signature scheme if said first message authentication code is valid.

18. The time stamping method of claim 17 wherein said identifying data comprises a digital representation of at least a portion of said document.

19. The time stamping method of claim 18 wherein said identifying data comprises a digital sequence derived by application of a deterministic function to at least a portion of said document.

20. The time stamping method of claim 19 wherein said digital sequence is a hash value derived by application of a one-way hashing function to at least a portion of said document.

21. The time stamping method of claim 19 wherein said time stamp receipt comprises a copy of at least a portion of said identifying data concatenated with said time indication.

22. The time stamping method of claim 21 wherein said time stamp receipt comprises a digital sequence derived from said identifying data concatenated with said time indication.

23. The time stamping method of claim 17 wherein said time stamp request further comprises an identification number associated with the requester.

24. The time stamping method of claim 17 wherein said first message authentication code comprises a numeric representation generated by application of a deterministic function to said time stamp receipt and said first secret key concatenated together.

25. The time stamping method of claim 24 wherein said second message authentication code comprises a numeric representation generated by application of a deterministic function to said first message authentication code concatenated with said first and third secret keys.

26. The time stamping method of claim 25 wherein the step of validating said second message authentication code comprises recomputing said second message authentication code at said outside agency using said first message authentication code received as part of said certification request, said second secret key and said third secret key, and comparing the recomputed second message authentication code to said received second message authentication code.

27. The time stamping method of claim 26 wherein the step of validating said first message authentication code comprises recomputing said first message authentication code at said outside agency using said time stamp receipt received as part of said certification request and said first secret key and comparing the recomputed first message authentication code to said received first message authentication code.

28. The time stamping method of claim 17 wherein the step of certifying said time stamp receipt comprises signing said first message authentication code using a private signature key controlled by said outside agency.

29. The time stamping method of claim 17 wherein the step of certifying said time stamp receipt comprises signing said time stamp receipt using a private signature key controlled by said outside agency.

30. The time stamping method of claim 17 further comprises the step of transmitting said certified time stamp receipt to said requestor.

31. The time stamping method of claim 17 wherein certifying said time stamp receipt at said outside agency comprises signing said time stamp receipt with a private signature key.

32. The time stamping method of claim 17 wherein certifying said time stamp receipt at said outside agency comprises signing said message authentication code with a private signature key.

* * * * *